(12) United States Patent
    Hulkki

(10) Patent No.: US 11,369,852 B2
(45) Date of Patent: Jun. 28, 2022

(54) HOCKEY PUCK AND A METHOD FOR MANUFACTURING THE SAME

(71) Applicant: WISEHOCKEY OY, Tampere (FI)

(72) Inventor: Mika Hulkki, Kämmenniemi (FI)

(73) Assignee: WISEHOCKEY OY, Tampere (FI)

( * ) Notice: Subject to any disclaimer, the term of this patent is extended or adjusted under 35 U.S.C. 154(b) by 94 days.

(21) Appl. No.: 16/956,426

(22) PCT Filed: Dec. 14, 2018

(86) PCT No.: PCT/FI2018/050916
§ 371 (c)(1),
(2) Date: Jun. 19, 2020

(87) PCT Pub. No.: WO2019/122512
PCT Pub. Date: Jun. 27, 2019

(65) Prior Publication Data
US 2020/0324185 A1    Oct. 15, 2020

(30) Foreign Application Priority Data

Dec. 20, 2017    (FI) ...................................... 20176139

(51) Int. Cl.
*A63B 67/14*      (2006.01)
*A63B 24/00*      (2006.01)
(Continued)

(52) U.S. Cl.
CPC .......... *A63B 67/14* (2013.01); *A63B 24/0021* (2013.01); *B23C 3/02* (2013.01);
(Continued)

(58) Field of Classification Search
CPC ................ A63B 67/14; A63B 24/0021; A63B 2024/0034; A63B 2102/24;
(Continued)

(56) References Cited

U.S. PATENT DOCUMENTS 4,846,475 A      7/1989   Newcomb et al.
5,564,698 A  *  10/1996   Honey ............... A63B 24/0021
                                              348/E5.051
(Continued)

FOREIGN PATENT DOCUMENTS

CA      2415980 A1    7/2004
CN    101607127 A    12/2009
FR      3010910 A1    9/2015

OTHER PUBLICATIONS

Search Report in connection to CN Application No. 2018800820702, dated Feb. 20, 2021.
(Continued)

*Primary Examiner* — Jeffrey S Vanderveen
(74) *Attorney, Agent, or Firm* — Meunier Carlin & Curfman LLC

(57) ABSTRACT

The present invention related to a hockey puck configured to transmit a radio signal, the hockey puck comprising: a cylindrical body, a radio Transmitter arranged in a cavity inside the cylindrical body, the cavity machined through a cylindrical surface of the cylindrical body, wherein the radio transmitter is positioned in the cavity with a casting material applied to the cavity. Further, the invention relates to a method for manufacturing the hockey puck.

8 Claims, 2 Drawing Sheets

(51) Int. Cl.
*B23C 3/02* (2006.01)
*A63B 102/24* (2015.01)

(52) U.S. Cl.
CPC ... *A63B 2024/0034* (2013.01); *A63B 2102/24* (2015.10); *A63B 2225/50* (2013.01)

(58) Field of Classification Search
CPC ............ A63B 2225/50; A63B 71/0605; A63B 69/0026; A63B 71/04; B23C 3/02; G01S 19/19
See application file for complete search history.

(56) References Cited

U.S. PATENT DOCUMENTS

| | | | |
|---|---|---|---|
| 9,463,360 B1 | 10/2016 | Richard | |
| 2007/0275801 A1 | 11/2007 | Proulx et al. | |
| 2016/0279493 A1* | 9/2016 | Tiitola | ................... A63B 59/70 |

OTHER PUBLICATIONS

International Search Report and Written Opinion issued by the International Searching Authority (ISA/EP) in PCT Application No. PCT/FI2018/050916 dated Feb. 18, 2019. 8 pages.

* cited by examiner

HOCKEY PUCK AND A METHOD FOR MANUFACTURING THE SAME

CROSS-REFERENCE TO RELATED APPLICATIONS

This application is a national stage application filed under 35 U.S.C. § 371 of PCT/FI2018/050916 filed Dec. 14, 2018, which claims the benefit of Finnish Patent Application No. 20176139 filed Dec. 20, 2017, the content of which is incorporated herein by reference in its entirety.

TECHNICAL FIELD

The invention concerns in general the technical field of sport goods. More particularly, the invention concerns a solution for hockey pucks.

BACKGROUND

Ice hockey is a team sport usually played on ice in which players of two teams use their sticks to take a hockey puck to opponent's goal. The ice hockey is known to be contact sport which is fast and physical game. The hockey puck is cylinder-shaped and nowadays made of a vulcanized rubber. A standardized ice hockey puck is black, 25 mm thick and 76 mm in diameter with a weight between 156 g and 170 g.

As mentioned the ice hockey is a fast game and it is challenging to follow by audience, but also by team officials, such as coaches. In order to gather more detailed information on the game there are developed solutions in which at least the hockey puck is equipped with an applicable radio transmitter and a motion of the ice puck is followed on the field with a measurement system. For example, the measurement system may refer to some indoor positioning system, which may determine a position of the hockey puck on a basis of radio signal obtained from the hockey puck by a plurality of sensors. In some sophisticated solutions the players may also carry the radio transmitter and thus it is possible to monitor players' positions on the field. By analyzing the obtained position information on the different parties, it is possible to generate enriched information on the game to parties willing to receive it.

During the use of the hockey puck it receives a lot of shocks from multiple sources. When the puck is shot it receives a huge force from a hockey stick and the shot may end up to goal frames, which are made of metal, or to a hockey rink structure. As is clear, the hockey puck receives a high shock when the puck hits the goal frame or rink structure. Moreover, the puck gets impact from other sources, such as from skates of the players and so on.

In the existing solutions the radio transmitter is mounted to the hockey puck by drilling an opening to a flat surface (i.e. a top or a bottom) of the puck and by positioning the radio transmitter therein, and applying applicable material to the opening into which the radio transmitter is positioned so that a shape of the puck may be recovered. However, the puck manufactured in the described manner has turned out to be fragile and it does not stand the shocks during the game. Moreover, a reconstruction of the hockey puck in the described manner has effect on characteristics of the puck in use. For example, the puck does not slide on ice in a similar manner as it used to and a balance of the puck structure may be affected.

Hence, there is need to develop the hockey pucks and the manufacturing methods further in order to introduce hockey pucks applicable to the game, which pucks at least in part mitigate the drawbacks of the existing solutions.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention.

The following summary merely presents some concepts of the invention in a simplified form as a prelude to a more detailed description of exemplifying embodiments of the invention.

An objective of the invention is to present a hockey puck and a method for manufacturing the hockey puck for enabling a transmit of radio signal by the hockey puck.

The objectives of the invention are reached by a hockey puck and a manufacturing method as defined by the respective independent claims.

According to a first aspect, a hockey puck configured to transmit a radio signal is provided, the hockey puck comprising: a cylindrical body comprising a flat upper surface and a flat lower surface; a radio transmitter arranged in a cavity inside the cylindrical body, the cavity machined through a cylindrical surface of the cylindrical body; wherein the radio transmitter is positioned in the cavity with a casting material applied to the cavity.

The casting material may be a cast resin based compound.

The radio transmitter may comprise a protective layer. The protective layer may be epoxy based compound.

Further, the cavity arranged inside the cylindrical body may have a width of 35 mm, height of 12 mm and depth of 45 mm.

According to a second aspect, a manufacturing method of a hockey puck configured to transmit a radio signal, the manufacturing method comprising: machining a cavity in a cylindrical body of the hockey puck, the cavity machined through a cylindrical surface of the cylindrical body; positioning of a radio transmitter in the cavity by applying casting material to the cavity.

The machining may be performed by milling.

A first portion of the casting material may be applied to the cavity prior to positioning the radio transmitter in the cavity. Further, a second portion of the casting material may be applied to the cavity in response to the positioning of the radio transmitter in the cavity on the first portion of the casting material. The second portion of the casting material may be applied by injecting it in the cavity through a through hole arranged in a mold housing into which the hockey puck may be positioned.

Still further, the method may comprise: treating the radio transmitter with a compound for generating a protective layer for the radio transmitter prior to positioning it in the cavity.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims.

Lists and groups of examples provided in the description given below are not exhaustive unless otherwise explicitly stated.

Figure 1:
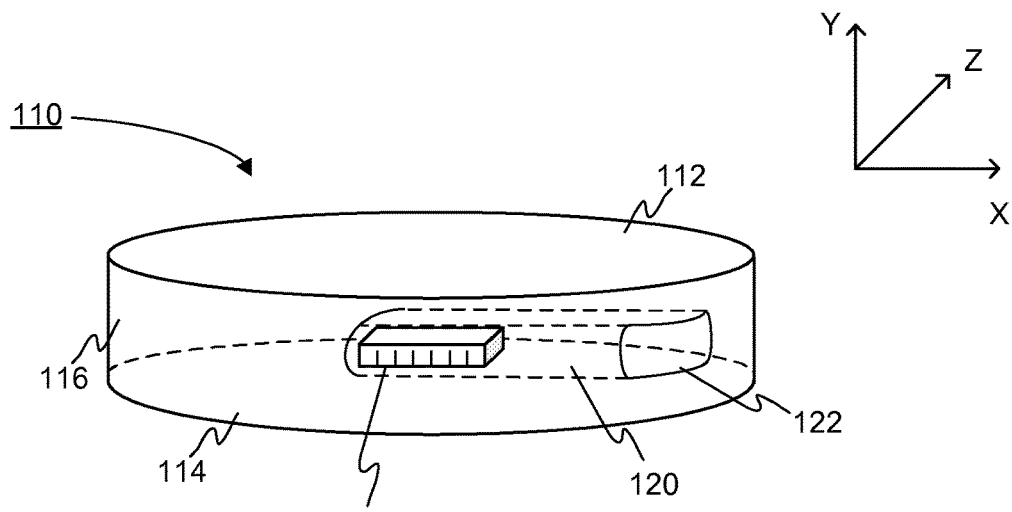
FIG. 1 illustrates schematically a hockey puck according to an embodiment of the invention.

FIG. 1 schematically illustrates a hockey puck 110 according to an embodiment of the invention. The hockey puck structure has a cylindrical body having a flat upper surface 112 and a flat lower surface 114 and a cylindrical surface 116. A radio transmitter 130 is arranged inside the hockey puck 110 through a cavity 120 machined to the hockey puck 110 so that a mouth of the cavity 122 is arranged on the cylindrical surface 116 of the body.

Figure 2A:
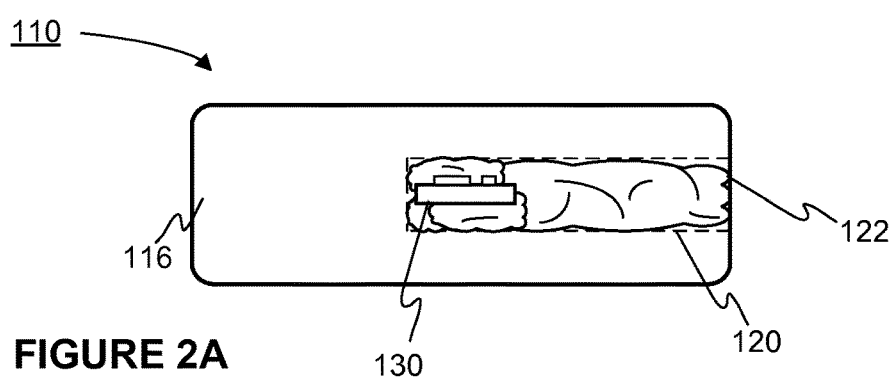
FIGS. 2A and 2B illustrate schematically a hockey puck according to an embodiment of the invention from different perspectives.
Figure 2B:
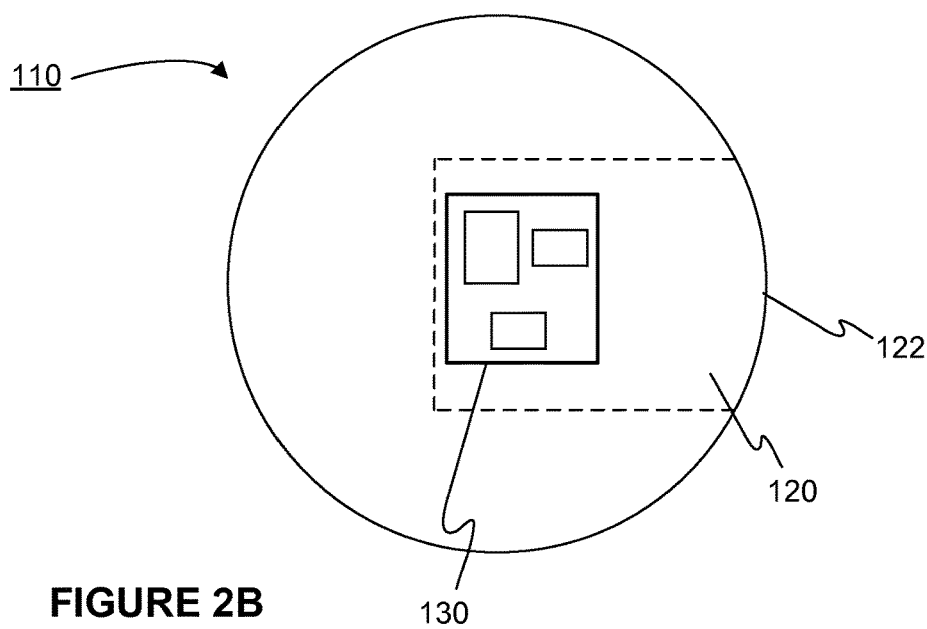

FIGS. 2A and 2B schematically illustrate the hockey puck 110 according to an embodiment of the invention from other perspectives. FIG. 2A illustrates a cross-sectional view of the hockey puck 110 according to an embodiment of the present invention. FIG. 2B illustrates an elevational cut-away view of the hockey puck 110 according to an embodiment of the present invention.

According to an embodiment of the invention the radio transmitter 130 consisting of electrical components, such as a radio module with an antenna, processor, a memory, a battery, may be treated with an applicable compound for generating a protective layer for the radio transmitter, and especially for the electrical components therein. The treating with the applicable material may advantageously be made prior to positioning the radio transmitter in the cavity of the body. The applicable material for generating the protective layer may e.g. epoxy based compound. For example, epoxy resin may be used for overcasting the radio transmitter chip. The generation of the protective layer on at least portion of the radio transmitter improves a mounting of the electrical components on the printed circuit board and, thus, an endurance of the radio chip to external shocks may be improved.

The positioning of the radio transmitter in the cavity may be implemented so that the radio transmitter is taken in the cavity into which an applicable casting material is input (the casting material is schematically illustrated in FIG. 2A). The radio transmitter is positioned in the casting material and the cavity is filled with the casting material so that the radio transmitter gets covered with the casting material. Naturally, the casting material may be manipulated on the cylindrical surface 116 so that the shape of the hockey puck 110 may also be recovered.

The size of the cavity is advantageously selected so that it enables a durability of the hockey puck 110 according to the present invention. In an advantageous embodiment the size of the cavity is such that a width of the opening is 35 mm (i.e. in a direction perpendicular to a direction of a normal of the flat upper or flat lower surface (marked as X axis in FIG. 1)) and a height is 12 mm (i.e. a direction parallel to a direction of a normal of the flat upper or flat lower surface (marked as Y axis in FIG. 1)), whereas a depth of the cavity is preferably 45 mm. Further, the machining of the cavity to the mentioned size has an advantage that a weight of the hockey puck 110 may be returned as standardized weight with the manufacturing process as described. Still further, the cavity size as described is optimal for a radio communication i.e. an absorption of the radio signal originating from the radio transmitting may be optimized.

The radio transmitter 130 arranged inside the hockey puck 100 in the manner as described above may be configured to implement any radio communication technology which is detectable by a measurement system by means of which at least a position information on the hockey puck 100 may be generated. In other words, the radio transmitter may transmit a signal in any frequency, preferably at radio frequency (RF). According to an embodiment of the invention the radio transmitter implements a short-range radio communication, such as Bluetooth® communication.

Figure 3:
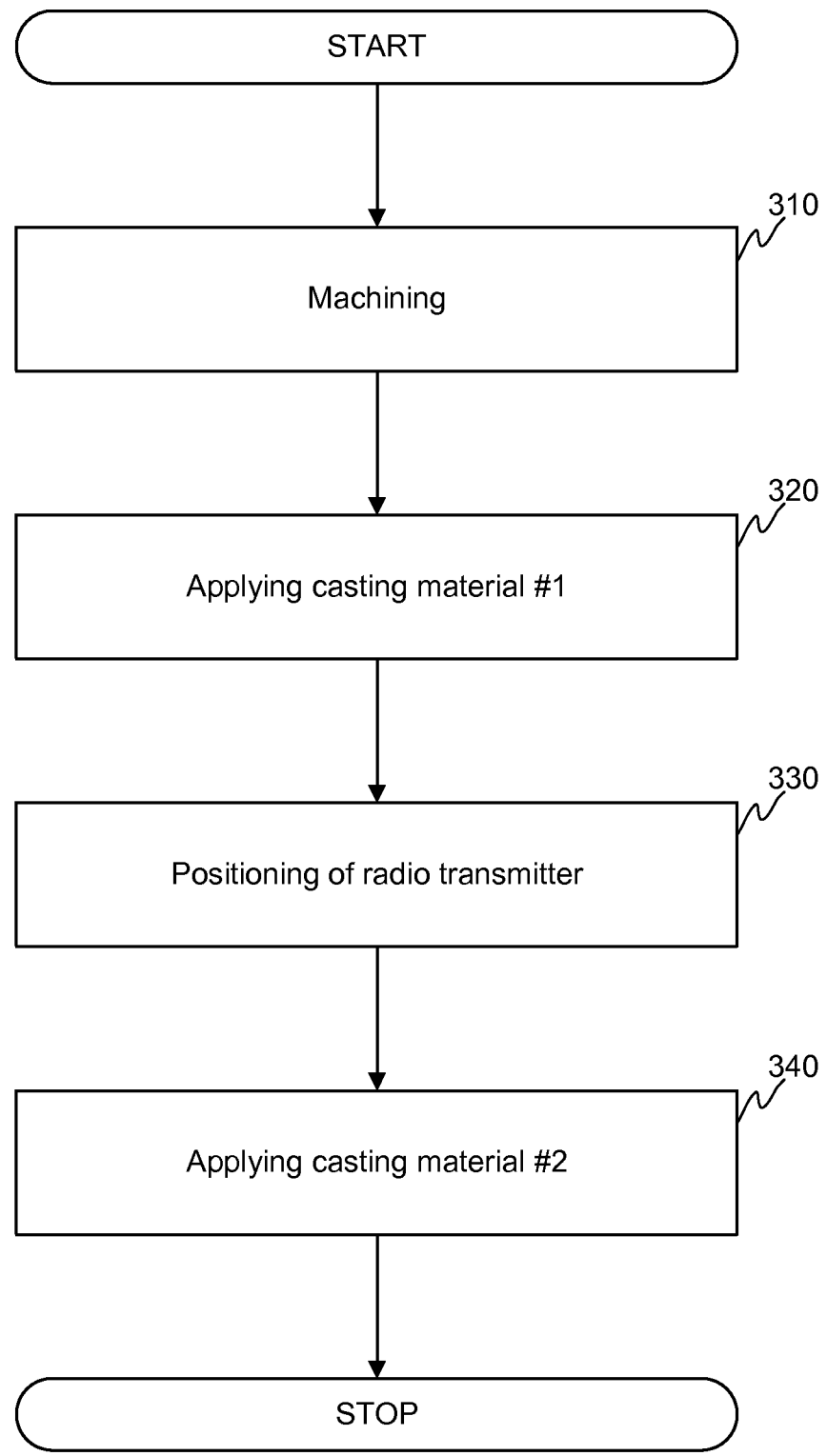
FIG. 3 illustrates schematically a manufacturing method of a hockey puck according to an embodiment of the invention.

Next, a method for manufacturing a hockey puck 110 according to an embodiment of the present invention is described by referring to FIG. 3. The manufacturing method as depicted in FIG. 3 is a non-limiting example for describing at least some steps of the method.

Regarding Step 310:

First, a hockey puck 110 made e.g. of a vulcanized rubber may be machined with an applicable machining method for generating a cavity 120 in the hockey puck 110. According to the present invention the cavity 120 is generated so that the cavity 120 opens, i.e. a mouth of the cavity 122, on the cylindrical surface 116 of the body. A preferred machining method is milling with a milling tool, i.e. a milling cutter, which is configured to mill the cavity 120 with predefined dimensions to the hockey puck 110. For example, the milling tool may be programmable to perform a milling operation when the dimensions of the cavity 120 is provided as an input. Naturally, the hockey puck 110 to be milled is positioned so that the machining operation may be performed to it.

In some embodiment of the manufacturing method the machining is performed to a plurality of hockey pucks 110 simultaneously. The hockey pucks 110 may be positioned in a bench which is served e.g. to a milling tool, which comprises a plurality of milling knives advantageously for machining the hockey pucks 110.

Regarding Step 320:

In response to the generation of the cavity 120 in the hockey puck 110 a first portion of a casting material may be applied in the generated cavity 120. The first portion of the casting material is applied in the cavity 120 for receiving and positioning a radio transmitter 110 thereto.

Regarding Step 330:

The radio transmitter may be positioned in the cavity 120 wherein the first portion of the casting material is applied for forming a bed for the radio transmitter 110. Advantageously the casting material is such that the radio transmitter chip is engaged in a fixed manner thereto at least when the casting material gets cured. The radio transmitter 110 may advantageously be supported with necessary supporting means, such as with an applicable support arm, in order to position the radio transmitter 110 accurately in the cavity 120.

Regarding Step 340:

Finally, a second portion of the casting material is applied in the cavity 120 for filling the cavity in full with the casting material. According to an embodiment prior to application of the second portion of the casting material in the cavity 120 the hockey puck 110 may be positioned in a mold housing, which forms a structure around at least portion of the hockey puck 110 in order to maintain a shape of the hockey puck 110 when the second portion of the casting material is applied in the cavity. For example, the mold housing may consist of two parts forming a mold for the hockey puck 110 under manipulation when the two parts are coupled, such as locked, against each other. According to an embodiment a through hole is arranged in the housing in order to apply the second portion of the casting material in the cavity 120 of the hockey puck 110 when the mouth of the cavity 122 is aligned with the through hole.

The cylindrical surface of a hockey puck 110 is typically patterned with grooves or similar. The patterns may also be generated to the casting material input to the cavity by patterning an inner surface of the mold housing facing the input casting material with the desired pattern, and in response to positioning the hockey puck 110 under manufacturing in the mold housing the desired pattern is generated to the casting material.

In the above described method applying of the casting material at the steps 320 and 340 may be performed by injecting the casting material in the cavity 120. According to an embodiment of the present invention the casting material may be cast resin based compound. For example, cast resin dedicated for electronics may be used. An example of the cast resin may e.g. be a compound known as electrical polyurethane resin consisting of polyol and isocyanate. A ratio of the materials when used may e.g. be 4:1, correspondingly. Generally speaking, the casting material has advantageously a hardness close to a hardness of the material of the hockey puck 110, i.e. typically vulcanized rubber. Preferably the hardness is a bit lower than the hardness of the hockey puck 110 in order to enable shock absorption at least in part. For example, the hardness of the standardized material of the hockey puck is 85 (Shore value) whereas the hardness of the electrical polyurethane resin consisting of polyol and isocyanate applied as the casting material in an embodiment of the present invention is 80 (Shore value).

In some other embodiment the radio transmitter 130 may be treated separately prior to positioning it in the cavity 330. The treating may refer to a generation of a protective layer to at least portion of the radio transmitter chip. For example, only one side of the chip may be treated with the material forming the protective layer or only portion of that. In some embodiment the radio transmitter 130 is fully covered with the protective layer. As mentioned, the protective layer may be formed e.g. with a epoxy based material, for example.

The use of the mentioned compounds for manufacturing the hockey puck 110 transmitting radio signals may require drying of the compound before proceeding to the next step in the method. Hence, for example after applying the first portion of the casting material 320 and positioning the radio transmitter thereto 330 it may be necessary to let the casting material to dry before proceeding with the step 340. The same applies after the step 340 before the hockey puck may be taken into use. As is clear the duration of the drying period is at least in part dependent on the compound in use, but typically it is from several days to several weeks. The same applies with the form of the protective layer for the radio transmitter 130.

As the radio transmitter 130 requires electrical energy for use it may comprise a battery configured to provide the energy for generating the radio signal for the measurement system.

The method for manufacturing the hockey puck 130 configured to transmit radio signals, and the hockey puck 130 itself, has an advantage that a friction surface does not change due to the manufacturing process in which the mouth of the cavity 122 is machined on the cylindrical surface 116 of the hockey puck 110. As well, a surface tension may be maintained the same as with a traditional hockey puck 110 not having the radio transmitter inside. The material selections as described, as well as the optimal selection of the size of the cavity 120, improves the endurance of the hockey puck 110 in order to tolerate hard external shocks as well as deceleration of the puck when used in hockey game. Additionally, the radio signal originating from the radio transmitter 130 is only absorbed in an acceptable amount thus enabling a detection of the hockey puck 110 with a measurement system implemented in the environment in which the hockey puck 110 is used to, such as around the hockey rink.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A hockey puck configured to transmit a radio signal, the hockey puck
   comprising:
   a cylindrical body comprising a flat upper surface and a flat lower surface, and
   a radio transmitter arranged in a cavity inside the cylindrical body, the cavity machined through a cylindrical surface of the cylindrical body,
   wherein the radio transmitter is positioned in the cavity with a casting material applied to the cavity and wherein the radio transmitter positioned in the cavity comprises a protective layer made of epoxy based compound.

2. The hockey puck according to claim 1, wherein the casting material is a cast resin based compound.

3. The hockey puck according to claim 1, wherein the cavity arranged inside the cylindrical body has a width of 35 mm, height of 12 mm and depth of 45 mm.

4. A manufacturing method of a hockey puck configured to transmit a radio signal, the manufacturing method comprising:
   machining a cavity in a cylindrical body of the hockey puck, the cavity machined through a cylindrical surface of the cylindrical body, and
   positioning of a radio transmitter in the cavity by applying casting material to the cavity,
   the manufacturing method further comprising:
   treating the radio transmitter with an epoxy based compound for generating a protective layer for the radio transmitter.

5. The manufacturing method according to claim 4, wherein the machining is performed by milling.

6. The manufacturing method according to any of claim 4, wherein a first portion of the casting material is applied to the cavity prior to positioning the radio transmitter in the cavity.

7. The manufacturing method according to claim 6, wherein a second portion of the casting material is applied to the cavity in response to the positioning of the radio transmitter in the cavity on the first portion of the casting material.

8. The manufacturing method according to claim 7, wherein the second portion of the casting material is applied by injecting it in the cavity through a through hole arranged in a mold housing into which the hockey puck is positioned.

\* \* \* \* \*